United States Patent
Jung

(10) Patent No.: US 7,606,674 B2
(45) Date of Patent: Oct. 20, 2009

(54) ON DIE THERMAL SENSOR

(75) Inventor: Jong-Ho Jung, Kyoungki-do (KR)

(73) Assignee: Hynix Semiconductor, Inc., Gyeonggi-do (KR)

( * ) Notice: Subject to any disclaimer, the term of this patent is extended or adjusted under 35 U.S.C. 154(b) by 117 days.

(21) Appl. No.: 11/819,792

(22) Filed: Jun. 29, 2007

(65) Prior Publication Data

US 2008/0101436 A1    May 1, 2008

(30) Foreign Application Priority Data

Oct. 31, 2006  (KR) .................... 10-2006-0106113

(51) Int. Cl.
*G01K 7/00*    (2006.01)

(52) U.S. Cl. ................... 702/64; 702/99; 702/130; 327/512; 327/539

(58) Field of Classification Search ............ 702/64, 702/99, 130, 136; 327/512, 513, 170, 539; 374/170
See application file for complete search history.

(56) References Cited

U.S. PATENT DOCUMENTS

| | | | |
|---|---|---|---|
| 6,531,911 B1 * | 3/2003 | Hsu et al. ............... | 327/512 |
| 6,876,250 B2 | 4/2005 | Hsu et al. | |
| 7,138,823 B2 | 11/2006 | Janzen et al. | |
| 2006/0111865 A1 | 5/2006 | Choi | |
| 2006/0158214 A1 | 7/2006 | Janzen et al. | |
| 2007/0040574 A1 | 2/2007 | Janzen et al. | |
| 2007/0098041 A1 * | 5/2007 | Seo ............... | 374/170 |

FOREIGN PATENT DOCUMENTS

| | | |
|---|---|---|
| JP | 10-255467 | 9/1998 |
| KR | 10-2004-0080357 | 9/2004 |
| KR | 10-2005-0114938 | 12/2005 |
| KR | 10-2006-0042703 A | 5/2006 |

OTHER PUBLICATIONS

Korean Office Action, issued in Korean Patent Application No. 10-2006-0106113, dated on Feb. 1, 2008.

* cited by examiner

*Primary Examiner*—Drew A Dunn
*Assistant Examiner*—Hien X Vo
(74) *Attorney, Agent, or Firm*—IP & T Law Firm PLC

(57) ABSTRACT

An on die thermal sensor includes a bandgap unit for generating a first voltage containing temperature information, a tracking unit for tracking a voltage level of the first voltage, and a low power control unit for generating a tracking enable signal for enabling the tracking unit and disabling the tracking unit after a minimum tracking operation time of the tracking unit elapses.

18 Claims, 7 Drawing Sheets

ON DIE THERMAL SENSOR

CROSS-REFERENCE TO RELATED APPLICATIONS

The present invention claims priority of Korean patent application number 2006-106113, filed on Oct. 31, 2006, which is incorporated by reference in its entirety.

BACKGROUND OF THE INVENTION

The present invention relates to an on die thermal sensor (ODTS) used in various semiconductor devices, and more particularly, to an ODTS under low power condition.

An application of an ODTS to a dynamic random access memory (DRAM), one of the semiconductor devices, will be described below. A DRAM cell consists of one switching transistor and one storage capacitor. Data state (logic HIGH or logic LOW) of the DRAM cell is determined by whether the storage capacitor is charged or discharged, that is, whether the terminal voltage of the storage capacitor is high or low.

Since data is stored in such a way that charges are accumulated in the capacitor, power consumption does not occur in principle. The data, however, may be lost because leakage current caused by PN junction of a metal-oxide semiconductor (MOS) transistor reduces an amount of charges stored initially. In order to prevent the data loss, the data of the DRAM cell is read before the data is lost, and a normal amount of charge is recharged according to the read data.

In other words, the data can be retained by repeating the read operation and the recharge operation periodically. The operation of recharging the cell charges is referred to as a refresh operation. The refresh operation is controlled by a DRAM controller. Due to the refresh operation, the DRAM dissipates refresh power. The reduction of power consumption is an important and critical issue in a battery operated system requiring lower power consumption.

One of many attempts to reduce power consumption in the refresh operation is to change a refresh period according to temperature. As the temperature is lower, the data retention time in the DRAM becomes longer. Based on this characteristic, the power consumption can be reduced by dividing a temperature region into a plurality of sub-regions and relatively reducing a refresh clock frequency at a low temperature region. Therefore, there is a demand for a device that can correctly detect the internal temperature of the DRAM and output information about the detected temperature.

In addition, as the integration level and operating speed are increasing, a large amount of heat is generated from the DRAM itself. Because the generated heat increases the internal temperature of the DRAM, the DRAM may be abnormally operated or damaged. Therefore, there is a demand for a device that can correctly detect the internal temperature of the DRAM and output information about the detected temperature.

FIG. 1 is a block diagram of a conventional ODTS.

Referring to FIG. 1, the conventional ODTS includes a bandgap unit 10, a tracking unit 20, and a control unit 30. The bandgap unit 10 includes a temperature detector 11 and a trimmer 12, and the tracking unit 20 includes a voltage comparator 21, a counter 22 and a converter 23. The control unit 30 controls the operation of the ODTS.

Specifically, the temperature detector 11 detects a temperature of a semiconductor device using the fact that a base-emitter voltage (VBE) change of a bipolar junction transistor (BJT) is about −1.8 mV/° C. in a bandgap circuit, which is not influenced by the change of temperature or power supply voltage of the semiconductor device. The temperature detector 11 outputs a first voltage VTEMP corresponding to the temperature by 1:1 amplifying the finely changing base-emitter voltage (VBE) of the BJT. That is, as the temperature of the semiconductor device is higher, the temperature detector 11 outputs a lower base-emitter voltage (VBE) of the BJT.

The converter 23 is implemented with a digital-to-analog converter (DAC). The converter 23 outputs a second voltage DACOUT in response to a temperature control code output from the counter 22. The second voltage DACOUT is an analog value and the temperature control code is a digital value. The second voltage DACOUT is determined by a maximum variation voltage VULIMIT and a minimum variation voltage VLLIMIT output from the trimmer 12.

The voltage comparator 21 compares the first voltage VTEMP and the second voltage DACOUT. When the first voltage VTEMP is lower than the second voltage DACOUT, the voltage comparator 21 outputs a decrement signal DEC to cause the counter 22 to decrease a preset digital code. On the other hand, when the first voltage VTEMP is higher than the second voltage DACOUT, the voltage comparator 21 outputs an increment signal INC to cause the counter 22 to increase the preset digital code.

In addition, the counter 22 increases or decreases the preset digital code in response to the increment signal INC or the decrement signal DEC output from the voltage comparator 21, and outputs the temperature control code containing temperature information.

The trimmer 12 receives a reference voltage VREF from the bandgap circuit that is not influenced by the change of the temperature or power supply voltage of the semiconductor device, and outputs the maximum variation voltage VULIMIT and the minimum variation voltage VLLIMIT that are not influenced by the change of the temperature or power supply voltage of the semiconductor device. In the manufacturing process of the semiconductor device, the range of the base-emitter voltage (VBE) of the BJT with respect to temperature is different in each die. Therefore, the potential level of the reference voltage VREF is previously set through an external circuit in order to increase the accuracy of temperature compensation. The maximum variation voltage VULIMIT and the minimum variation voltage VLLIMIT have a constant voltage difference.

Through the operation of the bandgap unit 10 and the tracking unit 20, the second voltage DACOUT tracks the first voltage VTEMP and then the digital code stored in the counter 22 becomes a digital code representing current temperature information.

The control unit 30 controls the bandgap unit 10 and the tracking unit 20. Specifically, the control unit 30 outputs an ODTS enable signal ODTS_ON to enable the bandgap unit 10 and outputs a first enable signal ADC_EN_OLD to control the tracking unit 20.

The first enable signal ADC_EN_OLD output from the control unit 30 is activated to a logic high level for a preset time, e.g., 30 µs, after the bandgap unit 10 is enabled in response to the ODTS enable signal ODTS_ON, and then is deactivated to a logic low level. In other words, the tracking unit 20 operates while the first enable signal ADC_EN_OLD is in the activated state, and is disabled automatically.

FIG. 2 is a graph showing current consumption of the ODTS of FIG. 1.

Referring to FIG. 2, the ODTS consumes a large amount of current during the period in which the tracking unit 20 operates in response to the first enable signal ADC_EN_OLD of a logic high level. Therefore, the conventional ODTS has a problem in that it consumes a large amount of current as the operation period of the tracking unit 20 becomes longer.

SUMMARY OF THE INVENTION

Embodiments of the present invention are directed at providing an ODTS that consumes a small amount of power by minimizing an operation time of a tracking unit.

In accordance with an aspect of the present invention, there is provided an on die thermal sensor which includes: a bandgap unit for generating a first voltage containing temperature information; a tracking unit for tracking a voltage level of the first voltage; and a low power control unit for generating a tracking enable signal for enabling the tracking unit and disabling the tracking unit after a minimum tracking operation time of the tracking unit elapses.

In accordance with an aspect of the present invention, there is provided an on die thermal sensor which includes: a bandgap unit for detecting a temperature of a semiconductor device to generate a first voltage containing temperature information; a tracking unit for generating a temperature control code by comparing the first voltage and a second voltage; a signal generator for outputting a tracking enable signal for enabling the tracking unit and disabling the tracking unit after a minimum tracking operation time of the tracking unit elapses; a controller for outputting the pre-tracking enable signal for controlling the signal generator; and a bandgap enable signal for enabling the bandgap unit.

DESCRIPTION OF SPECIFIC EMBODIMENTS

Hereinafter, an on die thermal sensor under low power condition in accordance with exemplary embodiments of the present invention will be described in detail with reference to the accompanying drawings.

Figure 1:
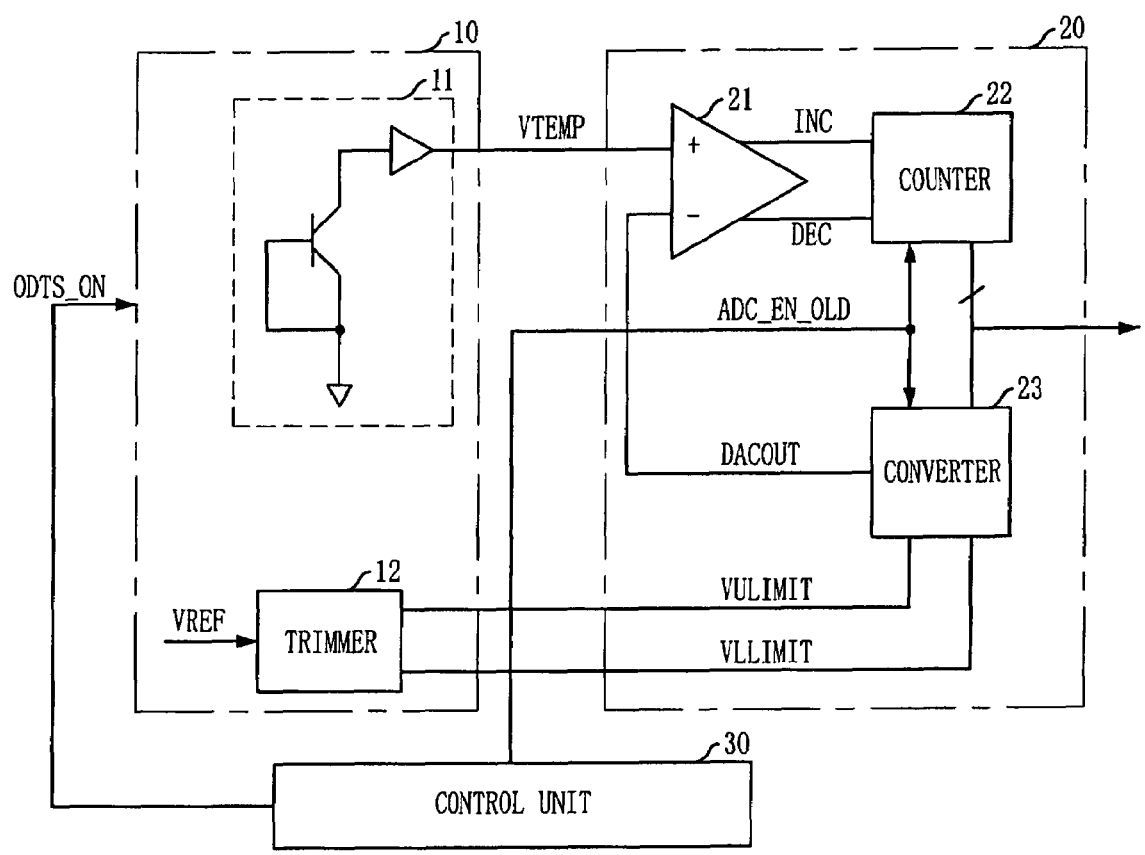
FIG. 1 is a block diagram of a conventional ODTS.
Figure 2:
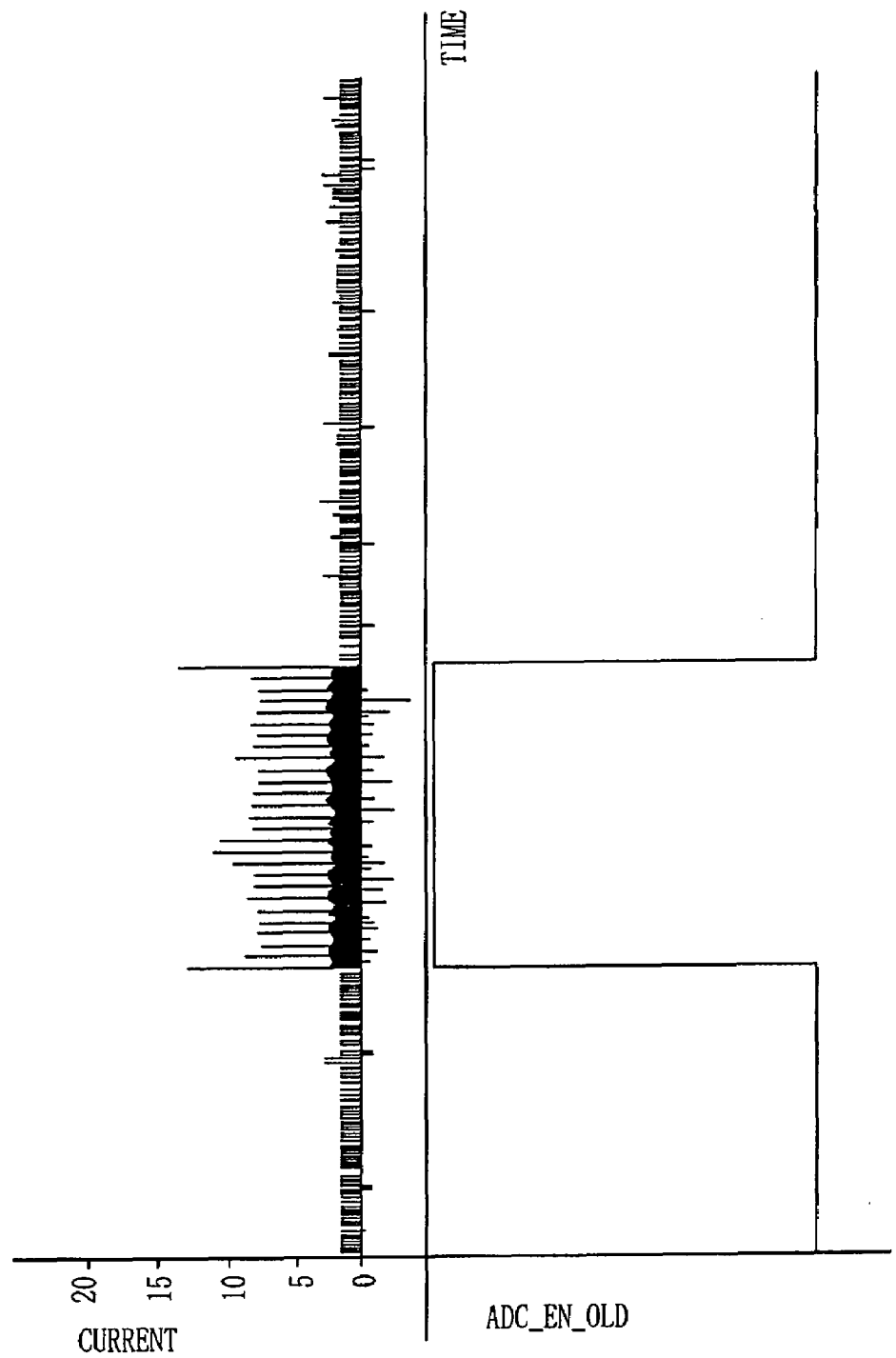
FIG. 2 is a graph showing current consumption of the conventional the conventional ODTS of FIG. 1.
Figure 3:
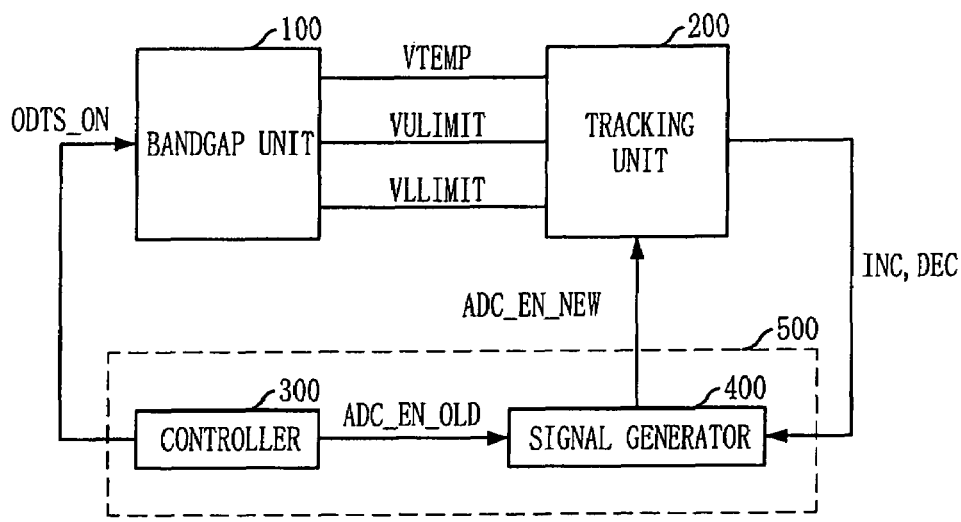
FIG. 3 is a block diagram of an ODTS under low power condition in accordance with an embodiment of the present invention.

FIG. 3 is a block diagram of an ODTS under low power condition in accordance with an embodiment of the present invention.

The low power ODTS includes a bandgap unit 100, a tracking unit 200, and a low power control unit 500. The low power control unit 500 includes a controller 300 and a signal generator 400.

The bandgap unit 100 generates a first voltage VTEMP containing temperature information. The tracking unit 200 tracks a voltage level of the first voltage VTEMP generated from the bandgap unit 100. The operation is the tracking unit 200 is controlled by a second enable signal ADC_EN_NEW. The controller 300 outputs a first enable signal ADC_EN_OLD to the signal generator 400, and outputs a bandgap enable signal ODTS_ON to the bandgap unit 100. The signal generator 400 generates the second enable signal ADC_EN_NEW that is activated in response to the first enable signal ADC_EN_OLD output from the control unit 300 and is deactivated after a minimum operation time of the tracking unit 200 elapses.

That is, the second enable signal ADC_EN_NEW is activated when the first enable signal ADC_EN_OLD is activated, and is deactivated after the minimum operation time of the tracking unit 200 elapses. Specifically, the second enable signal ADC_EN_NEW is deactivated when an increment signal INC and a decrement signal DEC are input a predetermine number of times, and the operation of the tracking unit 200 is controlled by the second enable signal ADC_EN_NEW. That is, the tracking unit 200 is controlled by the second enable signal ADC_EN_NEW, not the first enable signal ADC_EN_OLD.

While a second voltage DACOUT tracks the first voltage VTEMP, the tracking unit 200 generates only the increment signal INC because the second voltage DACOUT is lower than the first voltage VTEMP. Once the tracking operation is completed, however, the second voltage DACOUT is toggled centering on the first voltage VTEMP, and the increment signal INC and the decrement signal DEC are alternately generated. By disabling the second enable signal ADC_EN_NEW when the increment signal INC and the decrement signal DEC are input a predetermined number of times, the tracking unit 200 is disabled at a time point when its tracking operation is completed, thereby preventing unnecessary current consumption.

Figure 4:
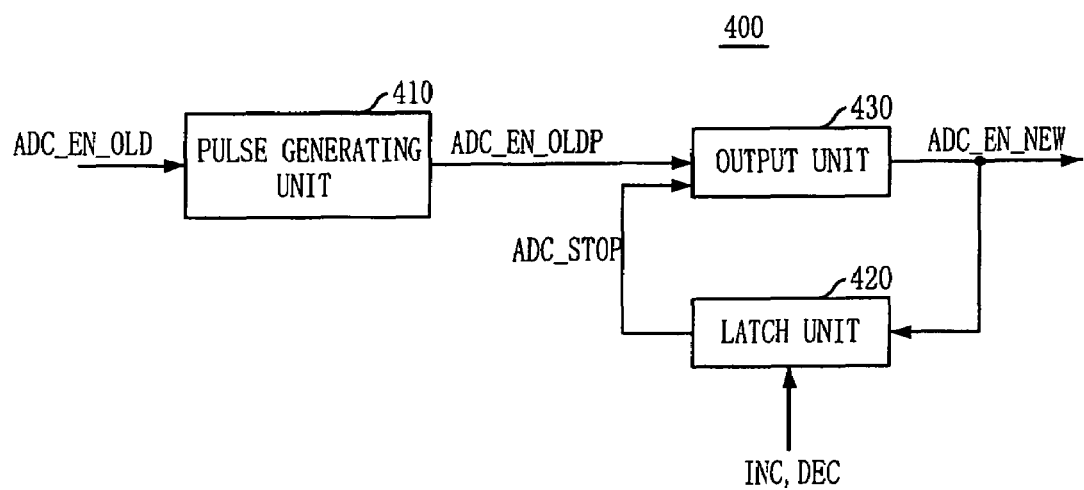
FIG. 4 is a block diagram of a signal generator shown in FIG. 3.

FIG. 4 is a block diagram of the signal generator 400 shown in FIG. 3.

The signal generator 400 includes a pulse generating unit 410, a latch unit 420, and an output unit 430.

The pulse generating unit 410 receives the first enable signal ADC_EN_OLD to output a first enable pulse ADC_EN_OLDP. The latch unit 420 sequentially latches the second enable signal ADC_EN_NEW at least one time according to the increment signal INC and the decrement signal DEC and outputs a stop signal ADC_STOP. In addition, the output unit 430 outputs the second enable signal ADC_EN_NEW that is activated in response to the first enable pulse ADC_EN_OLDP and is deactivated in response to the stop signal ADC_STOP.

Figure 5:
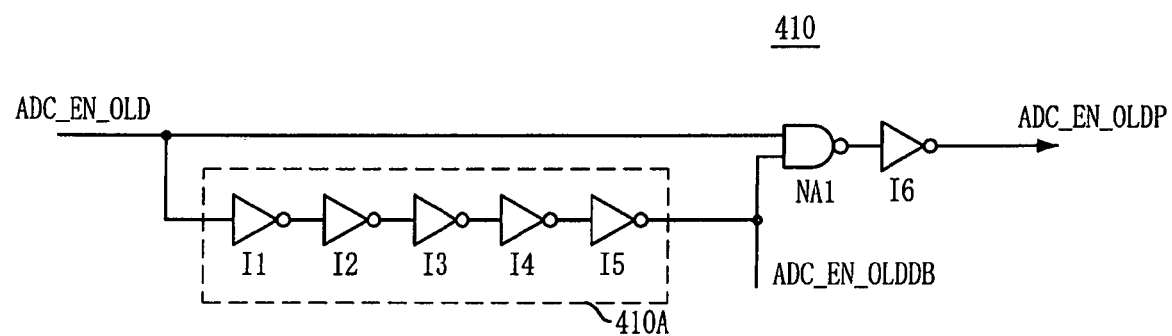
FIG. 5 is a circuit diagram of a pulse generating unit of the signal generator shown in FIG. 4.

FIG. 5 is a circuit diagram of the pulse generating unit 410 of the signal generator 400 shown in FIG. 4.

The pulse generating unit 410 includes an inverter chain 410A implemented with a plurality of inverters I1 to I5, an inverter I6 and a NAND gate NA1.

The inverter chain 410A inverts and delays the first enable signal ADC_EN_OLD by a predetermined time. The NAND gate NA1 is configured to receive the first enable signal ADC_EN_OLD and the inverted and delayed first enable signal ADC_EN_OLDDB. The inverter I6 inverts an output of the NAND gate NA1 to output the first enable pulse ADC_EN_OLDP.

Specifically, the first enable signal ADC_EN_OLD input to the pulse generating unit 410 is inverted and delayed by the inverter chain 410A including the plurality of inverters I1 to I5. When the first enable signal ADC_EN_OLD and the inverted and delayed first enable signal ADC_EN_OLDDB are input to the NAND gate NA1, a low pulse having a low period is generated while the two signals are all in a logic high level. The low pulse is again inverted by the inverter I6 and is output as the first enable pulse ADC_EN_OLDP having a high period while the two signals are all in the logic high level.

Figure 6:
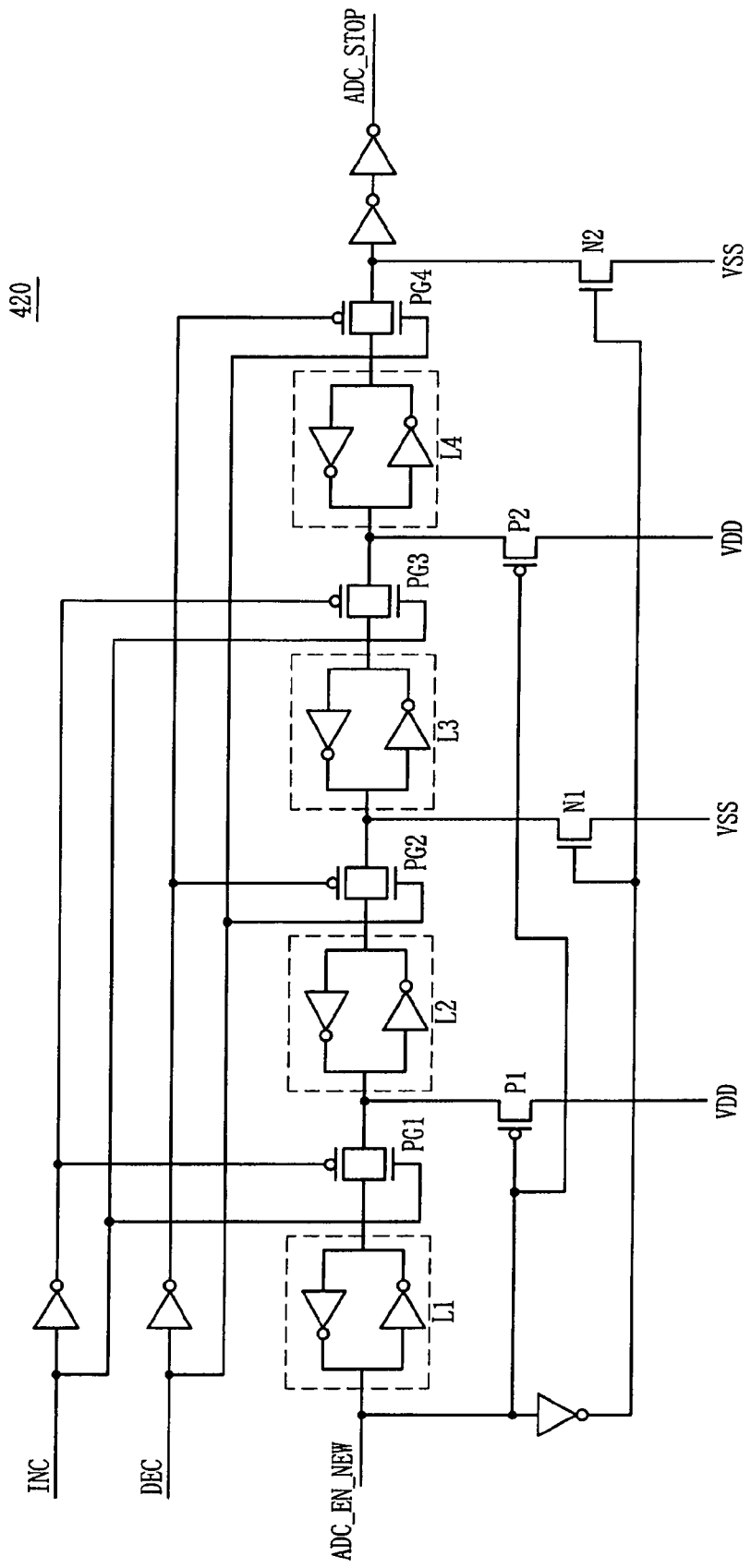
FIG. 6 is a circuit diagram of a latch unit of the signal generator shown in FIG. 4.

FIG. 6 is a circuit diagram of the latch unit 420 of the signal generator 400 shown in FIG. 4.

The latch unit 420 includes a plurality of serially connected latches L1, L2, L3 and L4 and a plurality of pass gates PG1, PG2, PG3 and PG4. The pass gates PG1, PG2, PG3 and PG4 are disposed among the latches L1, L2, L3 and L4 and are sequentially turned on in response to the increment signal INC and the decrement signal DEC.

Upon operation of the latch unit 420, when the second enable signal ADC_EN_NEW is input to the latch unit 420, the first latch L1 latches the second enable signal ADC_EN_NEW. When the increment signal INC of a logic high level is input, the first pass gate PG1 is turned on so that the signal latched in the latch L1 is transferred to the second latch L2. Then, when the decrement signal DEC of a logic high level signal is input, the second pass gate PG2 is turned on so that the signal latched in the second latch L2 is transferred to the third latch L3. In this manner, the increment signal INC and the decrement signal DEC must be alternately input in order to turn on the pass gates PG1, PG2, PG3 and PG4 in sequence. In the case of the circuit shown in FIG. 6, the second enable signal ADC_EN_NEW can be output as the stop signal ADC_STOP through the pass gates PG1, PG2, PG3 and PG4 when the increment signal INC and the decrement signal DEC are alternately input two times. That is, the stop signal ADC_STOP of a logic high level is output when the second enable signal ADC_EN_NEW of a logic high level is input and the increment signal INC and the decrement signal DEC are input two times, that is, the second voltage DACOUT is toggled two times.

The latch unit 420 activates the stop signal ADC_STOP to a logic high level by detecting the toggling of the second voltage DACOUT when the second enable signal ADC_EN_NEW is activated to a logic high level. Therefore, the number of the latches L1, L2, L3 and L4 and the pass gates PG1, PG2, PG3 and PG4 is determined according to how many times the second voltage DACOUT is toggled until the stop signal ADC_STOP is activated. That is, when the tracking operation of the tracking unit 200 is slow, it takes a long time to stabilize the second voltage DACOUT. Thus, the number of the latches L1, L2, L3 and L4 and the pass gates PG1, PG2, PG3 and PG4 increases. On the contrary, when the tracking operation of the tracking unit 200 is fast, it takes a short time to stabilize the second voltage DACOUT. Thus, the number of the latches L1, L2, L3 and L4 and the pass gates PG1, PG2, PG3 and PG4 decreases.

Transistors P1, P2, N1 and N2 disposed in a lower side of FIG. 6 are used to set an initial value when the second enable signal ADC_EN_NEW has a logic low level. The transistors P1, P2, N1 and N2 are all turned off, when the second enable signal ADC_EN_NEW is activated to a logic high level and the latch unit 420 begins to operate.

Figure 7:
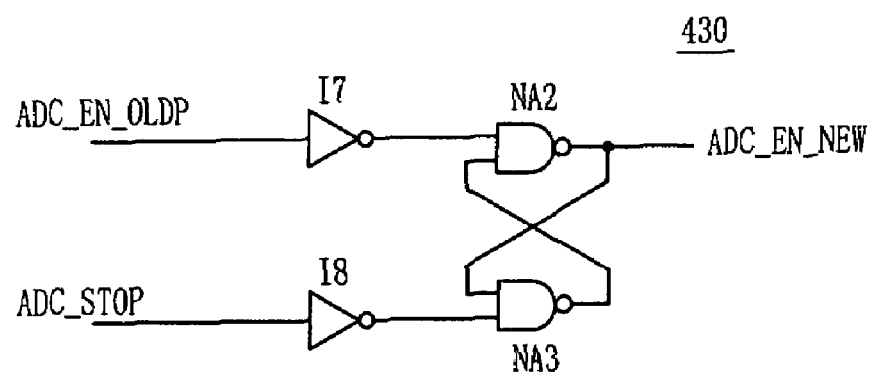
FIG. 7 is a circuit diagram of an output unit of the signal generator shown in FIG. 4.

FIG. 7 is a circuit diagram of the output unit 430 of the signal generator 400 shown in FIG. 4.

The output unit 430 includes first and second inverters I7 and I8, and first and second NAND gates NA2 and NA3.

The first inverter I7 inverts the first enable pulse ADC_EN_OLDP and the second inverter I8 inverts the stop signal ADC_STOP. The first and second NAND gates NA2 and NA3 form a set-reset (SR) latch configured to receive the inverted first enable pulse ADC_EN_OLDP and an inverted signal of the stop signal ADC_STOP.

Upon operation of the output unit 430, the first enable pulse ADC_EN_OLDP is inverted by an inverter I7 and then is input to the first NAND gate NA2. Therefore, when the first enable pulse ADC_EN_OLDP is a logic high level, the first enable pulse ADC_EN_OLDP of a logic low level is input to the NAND gate NA2. The first enable pulse ADC_EN_OLDP is latched by the first and second NAND gates NA2 and NA3 and the second enable signal ADC_EN_NEW of a logic high level is output through an output terminal of the first NAND gate NA2. In such a state, when the stop signal ADC_STOP of a logic high level is input, it is inverted by an inverter I8 and then is input to the second NAND gate NA3. That is, the stop signal ADC_STOP of a logic low level is input to the second NAND gate NA3. The stop signal ADC_STOP changes the output of the first NAND gate NA2 forming the SR latch together with the second NAND gate NA3. Consequently, the second enable signal ADC_EN_NEW changes to a logic low level.

That is, the output unit 430 outputs the second enable signal ADC_EN_NEW of a logic high level when the first enable signal ADC_EN_OLDP of a logic high level is input, and outputs the second enable signal ADC_EN_NEW of a logic low level from a time point when the stop signal ADC_STOP of a logic high level is input.

Figure 8:
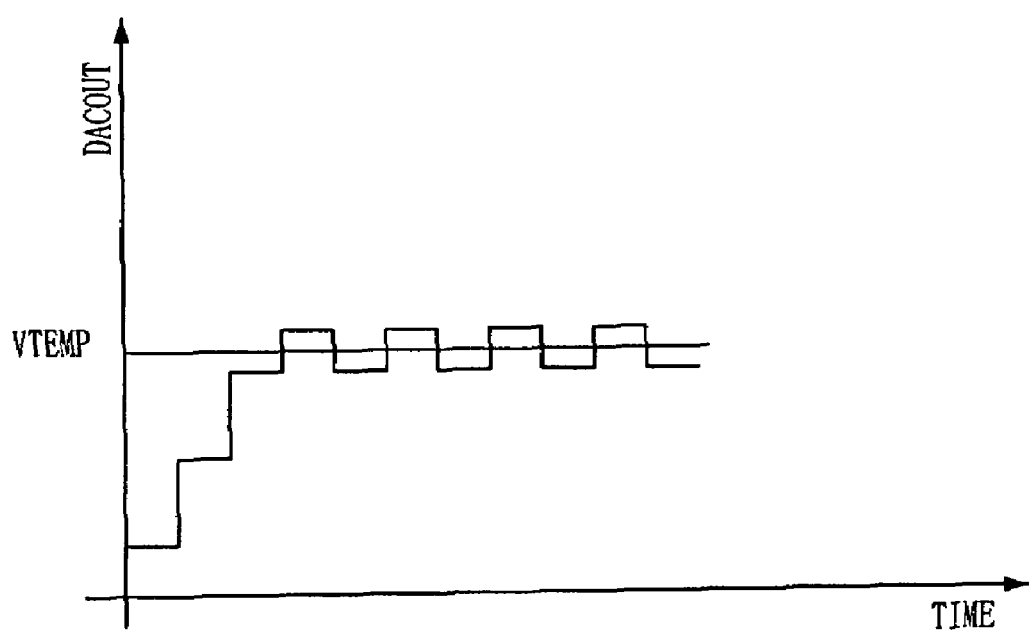
FIG. 8 is a graph showing a tracking operation in which a second voltage of a tracking unit tracks a first voltage.

FIG. 8 is a graph showing a tracking operation in which the second voltage DACOUT of the tracking unit 200 shown in FIG. 4 tracks the first voltage VTEMP.

Referring to FIG. 8, the second voltage DACOUT of the tracking unit 200 shown in FIG. 4 tracks the first voltage VTEMP. When the second voltage DACOUT rises up and tracks the first voltage VTEMP after a predetermined time elapses, the second voltage DACOUT is toggled centering on the first voltage VTEMP. The time point when the second voltage DACOUT is toggled centering on the first voltage VTEMP can be considered as a tracking end time point. Therefore, excessive current consumption can be prevented by stopping the operation of the tracking unit 200 from the tracking end time point. In other words, the ODTS in accordance with the present invention can reduce the current consumption by detecting the tracking end time point and stopping the operation of the tracking unit.

Figure 9:
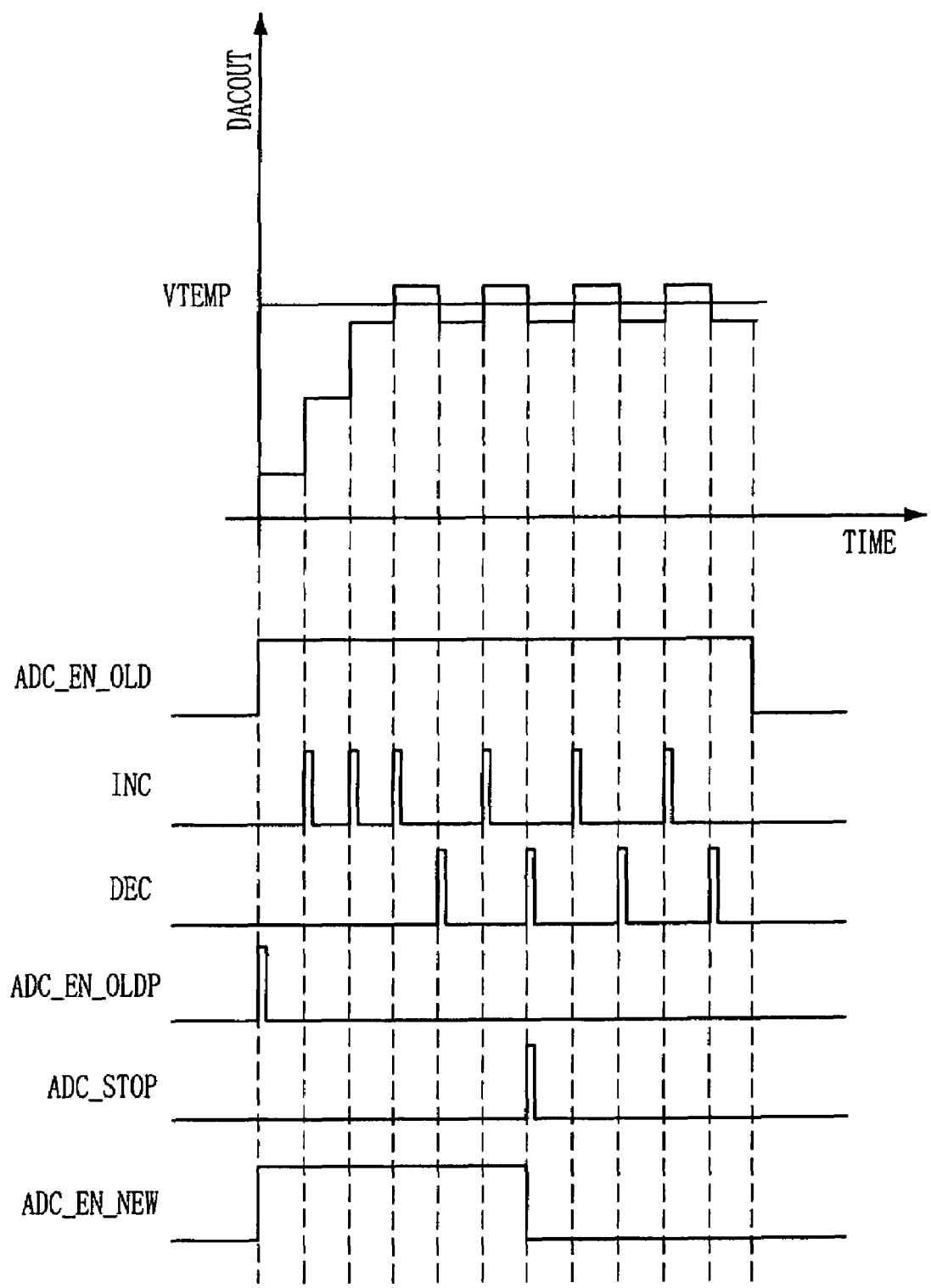
FIG. 9 is a timing diagram showing an operation of the signal generator shown in FIG. 4.

FIG. 9 is a timing diagram showing an operation of the signal generator 400.

Referring to FIG. 9, when the first enable signal ADC_EN_OLD of a logic high level is input, the first enable pulse ADC_EN_OLDP becomes a logic high level so that the tracking unit 200 begins the tracking operation. The second voltage DACOUT tracks the first voltage VTEMP because only the increment signal INC is input for a predetermined time. Then, when the tracking operation is completed, the second voltage DACOUT is toggled because the increment signal INC and the decrement signal DEC are alternately input. When the increment signal INC and the decrement signal DEC are alternately input a predetermined number of times, the stop signal ADC_STOP is activated to a logic high level, so that the second enable signal ADC_EN_NEW becomes a logic low level. Consequently, the tracking operation of the tracking unit 200 is stopped, thereby preventing unnecessary current consumption.

As described above, after the tracking operation is completed, the tracking unit consuming a large amount of current is turned off by detecting the toggling of the second voltage DACOUT. Therefore, the low power ODTS can be implemented.

While the present invention has been described with respect to the specific embodiments, it will be apparent to those skilled in the art that various changes and modifications may be made without departing from the spirit and scope of the invention as defined in the following claims.

What is claimed is:

1. An on die thermal sensor (ODTS), comprising:
a bandgap unit configured to generate a first voltage including temperature information in response to a bandgap enable signal;
a tracking unit configured to track a voltage level of the first voltage generated from the bandgap unit in response to enabling of a tracking enable signal; and
a low power control unit configured to generate a pre-tracking enable signal and to generate the tracking enable signal in response to the generated pre-tracking enable signal, the low power control unit is configured to outputs the bandgap enable signal to the bandgap unit, wherein the tracking enable signal is configured to be disabled after a minimum tracking operation time of the tracking unit elapses.

2. The ODTS as recited in claim 1, wherein the low power control unit includes:
   a signal generator for outputting the tracking enable signal that is activated in response to a pre-tracking enable signal and is deactivated after the minimum tracking operation time of the tracking unit elapses; and
   a controller for outputting the pre-tracking enable signal for controlling the signal generator.

3. The ODTS as recited in claim 2, wherein the signal generator deactivates the tracking enable signal when an increment signal and a decrement signal are input a predetermined number of times during the tracking operation of the tracking unit.

4. The ODTS as recited in claim 3, wherein the predetermined number of times increases when the tracking operation of the tracking unit is slow, and decreases when the tracking operation of the tracking unit is fast.

5. The ODTS as recited in claim 3, wherein the signal generator includes:
   a pulse generating unit for receiving the pre-tracking enable signal to output a first enable pulse;
   a latch unit for sequentially latching the tracking enable signal at least one time according to the increment signal and the decrement signal, and outputting a stop signal; and
   an output unit for outputting the tracking enable signal that is activated in response to the first enable pulse and is deactivated in response to the stop signal.

6. The ODTS as recited in claim 5, wherein the pulse generating unit includes:
   an inverter chain for inverting and delaying the pre-tracking enable signal by a predetermined time;
   a NAND gate for performing a NAND operation to the pre-tracking enable signal and an output signal of the inverter chain; and
   an inverter for inverting an output of the NAND gate to output the first enable pulse.

7. The ODTS as recited in claim 5, wherein the latch unit comprises:
   a plurality of serially connected latches for latching the tracking enable signal; and
   a plurality of pass gates disposed among the latches and sequentially turned on in response to the increment signal and the decrement signal.

8. The ODTS as recited in claim 5, wherein the output unit comprises first and second NAND gates forming a set-reset (SR) latch configured to receive the first enable pulse and the stop signal.

9. The ODTS as recited in claim 1, wherein the low power control unit outputs a bandgap enable signal for enabling the bandgap unit.

10. An on die thermal sensor (ODTS), comprising:
    a bandgap unit configured to detect a temperature of a semiconductor device to generate a first voltage including temperature information in response to a bandgap enable signal;
    a tracking unit configured to generate a temperature control code by comparing the first voltage and a second voltage in response to enabling of a tracking enable signal;
    a controller configured to output the bandgap enable signal to the bandgap unit and to output a pre-tracking enable signal; and
    a signal generator configured to output a tracking enable signal in response to the pre-tracking enable signal outputted from the controller,
    wherein the tracking enable signal is inactivated after the minimum tracking operation time of the tracking unit elapses.

11. The ODTS as recited in claim 10, wherein the tracking unit includes:
    a voltage comparator for comparing the first voltage and the second voltage to output a decrement signal and an increment signal;
    a counter for increasing or decreasing a preset digital code in response to the increment signal or the decrement signal, and outputting the temperature control code; and
    a converter for outputting the second voltage in response to the temperature control code.

12. The ODTS as recited in claim 11, wherein the voltage comparator outputs the decrement signal when the first voltage is lower than the second voltage, and outputs the increment signal when the first voltage is higher than the second voltage.

13. The ODTS as recited in claim 12, wherein the signal generator deactivates the tracking enable signal when the increment signal and the decrement signal are input a predetermined number of times during the tracking operation of the tracking unit.

14. The ODTS as recited in claim 13, wherein the predetermined number of times increases when the tracking operation of the tracking unit is slow, and decreases when the tracking operation of the tracking unit is fast.

15. The ODTS as recited in claim 13, wherein the signal generator includes:
    a pulse generating unit for receiving the pre-tracking enable signal to output a first enable pulse;
    a latch unit for sequentially latching the tracking enable signal at least one time according to the increment signal and the decrement signal, and outputting a stop signal; and
    an output unit for outputting the tracking enable signal that is activated in response to the first enable pulse and is deactivated in response to the stop signal.

16. The ODTS as recited in claim 15, wherein the pulse generating unit includes:
    an inverter chain for inverting and delaying the pre-tracking enable signal by a predetermined time;
    a NAND gate for performing a NAND operation to the pre-tracking enable signal and an output signal of the inverter chain; and
    an inverter for inverting an output of the NAND gate to output the first enable pulse.

17. The ODTS as recited in claim 15, wherein the latch unit comprises:
    a plurality of serially connected latches for latching the tracking enable signal; and
    a plurality of pass gates disposed among the latches and sequentially turned on in response to the increment signal and the decrement signal.

18. The ODTS as recited in claim 15, wherein the output unit comprises first and second NAND gates forming a set-reset (SR) latch configured to receive the first enable pulse and the stop signal.

* * * * *